United States Patent Office 2,754,312
Patented July 10, 1956

2,754,312

AMINOALKYL CYCLOPOLYSILOXANE COMPOSITIONS AND THEIR PREPARATION

John R. Elliott, Schenectady, N. Y., assignor to General Electric Company, a corporation of New York No Drawing. Application August 31, 1953,
Serial No. 377,675

6 Claims. (Cl. 260—448.2)

This application is a continuation-in-part of my application Serial Number 242,186, filed August 16, 1951, now abandoned, and assigned to the same assignee as the present application.

This invention is concerned with a process for making organosilicon compositions containing nitrogen attached to silicon through aliphatic carbon. More particularly, the invention relates to a process for making an organosilicon composition containing nitrogen attached to silicon through aliphatic carbon which process comprises effecting reaction between (1) a compound having the formula HNXX₁, where X and X₁ are members selected from the class consisting of hydrogen, monovalent hydrocarbon radicals, aminoalkyl radicals, aminoaryl radicals, and further members whereby X and X₁ taken together with the nitrogen form a cycloaliphatic nitrogen-containing radical, and (2) a cyclopolysiloxane compound containing chlorine attached to silicon through aliphatic carbon. The invention also includes compositions prepared in accordance with the process described above.

Organosilicon compounds containing nitrogen attached directly to the silicon atom are known in the art. However, organosilicon compounds containing nitrogen attached to silicon through aliphatic carbon are only slightly known in the art because of the difficulty with which such types of organosilicon compounds are prepared. In organic chemistry there are several ways in which amino groups (for example, —NXX₁ groups where X and X₁ have the meanings given above) may be attached to carbon by carbon-nitrogen bonds. One method comprises reacting an aliphatic compound containing aliphatic carbon-bonded chlorine with ammonia or an amino compound containing nitrogen-bonded hydrogen using either alcoholic solutions of the ammonia or amino compound or aqueous solutions of such materials. The reaction with the carbon-bonded chlorine goes relatively easy and in fairly good yield. Another method comprises reacting the carbon-bonded chlorine with sodium amide dissolved in liquid ammonia. Again, this reaction goes in fairly good yields and quite satisfactorily.

However, when one attempts to use the foregoing methods to attach nitrogen to aliphatic carbon which, in turn, is attached to silicon, innumerable difficulties are encountered with the net result that one finds that the methods described above are of little avail in preparing organosilicon compounds (including the cyclopolysiloxanes herein described) containing nitrogen attached to silicon through aliphatic carbon. Thus, when one attempts to react an ethyl alcohol solution saturated with gaseous ammonia with chloromethylpentamethyldisiloxane for times as long as one month, it will be found that little, if any, of the aminomethylpentamethyldisiloxane is obtained. Instead one finds that the chloromethyl group is cleaved in the alcoholic ammonia. Aqueous ammonia used in place of alcoholic ammonia will give generally the same results.

While previous workers have prepared a limited number of organosilicon compounds containing nitrogen attached to silicon through aliphatic carbon, the procedures for making such compositions are quite complex and of little utility from a commercial viewpoint. One such method involves use of the complicated Hoffman degradation process which holds little commercial interest because of its complexity, and because compounds containing the

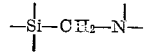

grouping cannot be prepared by this method.

I have now discovered unexpectedly a simple method for making cyclopolysiloxane compositions which have nitrogen attached to silicon through the medium of aliphatic carbon. More particularly, in accordance with my discovery, I have found that if one employs cyclopolysiloxane compositions containing a chlorine atom attached to the silicon through the medium of aliphatic carbon, one can effect replacement of the chlorine atom with a nitrogen atom by reacting the aforesaid chlorinated derivative directly with a compound corresponding to the general formula, HNXX₁, where X and X₁ have the meanings given above.

My invention is believed to be unique in making cyclopolysiloxane compositions containing nitrogen bonded to silicon by aliphatic carbon in that it makes use of the only known neutral or acid aminating media and also is characterized by the fact that only a neutral or acid medium in the sense described below is operative. In addition it makes possible the preparation of aminomethyl cyclopolysiloxane compositions which cannot satisfactorily be prepared by any prior known process.

In the above formula HNXX₁, X and X₁, in addition to being hydrogen may be, for example, an aminoalkyl radical, for instance, aminomethyl, aminoethyl, aminopropyl, aminobutyl, etc.; an aminoaryl radical, e. g., aminophenyl, aminobiphenyl, etc.; an alkyl radical, for instance, methyl, ethyl, propyl, isopropyl, butyl, hexyl, actyl, isooctyl, etc.; aryl radical, for instance, phenyl, naphthyl, biphenyl, anthracyl, etc.; alkaryl radical, for instance, tolyl, xylyl, ethylphenyl, etc.; aralkyl radical, for instance, benzyl, phenylethyl, etc.; cycloaliphatic, for instance, cyclopentane, cyclohexane, etc. Examples of cycloaliphatic nitrogen radicals in which X and X₁ are both attached to the same nitrogen, are, for instance, piperidine, morpholine, pyrrolidine, methyl piperidine, piperazine, etc. It is also apparent that compounds such as dimethyl amine, diethyl amine, dibutyl amine, hexamethylene diamine, ethylene diamine, etc., are included in the above general formula. It is preferred, if possible, that the compound having the formula HNXX₁ (which hereinafter will be referred to as the "amino compound") be a liquid under the conditions of the reaction, and that the reaction medium be neutral or acidic in the sense hereinafter described. However, solid amino compounds or liquid amino compounds dissolved in neutral inert solvents for the amino compounds and the chlorinated cyclopolysiloxane compounds are not precluded and may advantageously be employed. Such inert solvents are, e. g., benzene, toluene, xylene, saturated liquid aliphatic compounds, etc.

The types of cyclopolysiloxane compounds containing chlorine attached to silicon through aliphatic carbon which may be employed in the practice of the present invention are numerous and for the purpose of brevity such a cyclopolysiloxane compound will be referred to as the "chlorinated cyclopolysiloxane". The chlorinated cyclopolysiloxane is intended preferably to include those in which the aliphatic group containing chlorine is attached directly to a silicon atom through a carbon-silicon bond and may contain one or more carbon-bonded chlorines, but no more than one chlorine atom being on any one carbon atom. The type of chlorinated cyclopolysiloxane which may be employed comprises chlorinated derivatives of cyclopolysiloxanes corresponding to the general formula:

I 

where carbon-bonded hydrogen is replaced with carbon-bonded chlorine. In the above formula $n$ is equal to from 3 to 10 or more and preferably is equal to from 4 to 6. R is an alkyl radical such as the methyl, ethyl, propyl, iso-propyl, butyl, etc. radicals; $R_1$ is a number selected from the class consisting of hydrogen and monovalent hydrocarbon radicals similar to those described for X and $X_1$ above, and may also be an hydroxy group, or a hydrolyzable group, for example, a halogen, for instance, chlorine, bromine, etc.; an alkoxy radical, for instance, methoxy, ethoxy, tertiary butoxy, etc.; amino groups; the —NCO or —NCS group, etc. More particularly, the chlorinated cyclopolysiloxane may comprise cyclopolysiloxanes, such as the tetramer or pentamer of dimethylsiloxane and methyl phenylsiloxane having, respectively, the following formulae:

II 

and

III 

where a carbon-bonded hydrogen of the alkyl group is replaced with a carbon-bonded chlorine and where $n$ is an integer equal, e. g., from 4 to 6, but preferably is equal to 4. Some of these chlorinated cyclic derivatives are more particularly described in McGregor et al. Patent 2,522,053 and include cyclic chlorinated dimethylsiloxane containing from 1 to 10 or more carbon-bonded chlorine atoms per cyclic unit.

Various methods may be employed for preparing the different chlorinated cyclopolysiloxanes described above. In this connection, attention is directed to patents such as Kohl Patent 2,530,202; Goodwin Patents 2,527,807, 2,527,809, 2,511,812, and 2,483,972; Fletcher et al. Patent 2,528,355; Gilliam Patent 2,474,578; Nordlander Patent 2,439,669; Sommer Patent 2,512,390; Elliott et al. Patents 2,513,924 and 2,457,539; Speier Patents 2,527,591, 2,510,148, and 2,510,149; and McGregor et al. Patents 2,507,316, 2,522,053, 2,384,384, and 2,435,148. These various chlorinated cyclopolysiloxanes may be prepared, for instance, from the cyclopolysiloxanes by merely passing the requisite amount of chlorine into the polymer to be treated in the presence of light, for instance. The chlorine becomes attached to the carbon atoms of one or more of the aliphatic radicals bonded to the silicon atoms by displacement of hydrogen therefrom. The use of ultraviolet light as a means for effecting chlorination of the groups attached to the silicon atoms has been very helpful as shown in Nordlander Patent 2,439,669. Where the aliphatic radicals attached to the silicon atoms by carbon-silicon linkages at the cyclopolysiloxane are radicals other than the methyl radical, i. e., ethyl, propyl, butyl, etc., it will be apparent that the degree of substitution of the chlorine for the hydrogen or hydrogens on the aliphatic radical may vary and may occur throughout the aliphatic radical attached to the silicon atoms. I do not intend to be limited to any particular number of chlorine atoms since one or more chlorine atoms substituted on one or more of the aliphatic groups are contemplated, although one chlorine substituent per carbon atom is the upper limit of chlorine substitution. Typical chlorinated cyclopolysiloxanes are chloromethylheptamethyl cyclotetrasiloxane, chloromethyltrimethyltetraphenyl cyclotetrasiloxane, and chloroethylheptaethyl cyclotetrasiloxane.

A group of aminated cyclopolysiloxanes which may be prepared are, for instance, those coming within the general formula

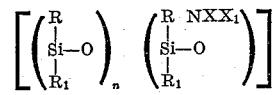

where $n$ is an integer equal to 2 to 9 and X, $X_1$, R and $R_1$ have the meanings defined above. More particularly, the aminated cyclopolysiloxanes may be the product of reaction of $HNXX_1$ and chlorinated cyclopolysiloxanes, such as the tetramer or pentamer of dimethylsiloxane or methylphenylsiloxane giving the following structures, respectively:

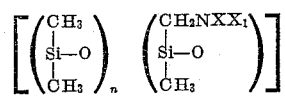

and

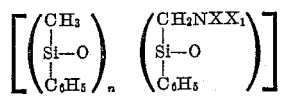

where $n$ is an integer from 3 to 4 and X and $X_1$ have the meaning defined above.

When X is hydrogen in the amino compound, $HNXX_1$, two molecules of the chlorinated cyclopolysiloxane may react with the amino compound to form a secondary amine. When both X and $X_1$ are hydrogen three molecules of the chlorinated cyclopolysiloxane may react with the amino compound to form a tertiary amine of the formula $(Z)_3N$ where Z is the residue of a cyclopolysiloxane.

Typical compounds within the scope of this invention are aminomethyl heptamethyl cyclotetrasiloxane, n-butylaminomethyl heptamethyl cyclotetrasiloxane, diethylaminomethyl heptamethyl cyclotetrasiloxane, dimethylaminomethyl heptamethylcyclotetrasiloxane, N,N-phenylmethylaminomethyl heptamethylcyclotetrasiloxane, analinomethylheptamethylcyclotetrasiloxane, aminoethyheptaethylcyclopolysiloxane, aminomethylpentamethylcyclotrisiloxane, aminomethylmonomethylcyclopentasiloxane, and n-butylaminomethylundecamethylcyclohexasiloxane.

It is generally preferred and desirable that the reaction medium be substantially anhydrous, especially when using liquid ammonia, and that the amino compound be liquid at room temperature in order to permit easy reaction with the chlorinated organosilicon composition.

In addition, although I do not wish to be bound by speculative theoretical considerations, it is believed that a substantially neutral or acid medium is essential for the reaction between the amino compound and the chlorinated cyclopolysiloxane composition, and that there is essentially complete absence of any alkaline medium. The term "neutral" and "acid" may be defined in the sense of the Franklin-Germann theory of acids and bases [see J. A. C. S. 27, 820 (1905) and J. A. C. S. 47, 2461 (1925)] which presents a limited phase of the Lewis (see Lewis' book "Valence and Structure of Atoms and Molecules," published by Chemical Catalog Company, New York city, 1923) generalized theory of acids and bases. I prefer to use the Franklin and Germann theory of acids and bases because it is more germane to the concept of this invention since it explains more adequately the neutral and acid media referred to above. Thus, a system comprising for instance ammonium chloride dissolved in anhydrous liquid ammonia is considered an acid system and such acidic systems are intended to be included. The work of Franklin and Germann defines an acid as a solute that gives rise to a cation characteristic of the solvent. This may be characterized by the following equations which show the ionization of ammonia as compared to the ionization of water $$2NH_3 \rightleftharpoons \overset{+}{NH_4} + \overset{-}{NH_2}$$
(ammonium ion) (amide ion)

$$2H_2O \rightleftharpoons H_3O^+ + OH^-$$

Thus, anhydrous liquid ammonia is a neutral substance as is water and an anhydrous solution of ammonia chloride in liquid ammonia is an acid because the solute has increased the concentration of the ammonium cation. Over and above this theory, the acidic characteristics of the latter system are emphasized by the fact that this ammonium chloride-ammonia solution (a) neutralizes bases, (b) gives the acid color change with acid-base indicators, (c) replaces weaker acids from their compounds, (d) catalyzes many reactions which are known to be acid-catalyzed, and (e) reacts with metals with the liberation of hydrogen. Solutions of hydrochloride salts of the other amino compounds described above (having the formula $HNXX_1$) in the amino compound per se adhere to the same theoretical considerations and possess similar acidic characteristics.

Reaction between the amino compound and the chlorinated cyclopolysiloxane may be conducted within a wide range of atmospheric and superatmospheric pressures. Superatmospheric pressures (either by autogenous pressures or pressures induced in other manners) are preferred for faster and more complete reaction.

The temperatures employed during the reaction may be varied widely. Generally, temperatures ranging from about −35° to 150° C. or more, are advantageously employed. Reaction appears, however, to go satisfactorily in many instances at room temperature.

After the reaction has been concluded, the excess amino compound is removed, the residue treated with alkali, and the resultant product resolved into its components, for instance, by fractional distillation, to give the desired cyclopolysiloxane composition containing nitrogen attached to silicon through aliphatic carbon.

The amount of amino compound employed for reaction with the chlorinated cyclopolysiloxane should be sufficient to react with all the reactive groups in the chlorinated cyclopolysiloxane other than the chlorine attached to silicon by aliphatic carbon, and still have an excess of the amino compound sufficient to react with the chlorine atom or atoms attached to silicon through aliphatic carbon. Since it is usually desirable that the reaction between the amino compound and the chlorinated cyclopolysiloxane be conducted using an excess of the amino compound as the reaction medium, it is also, therefore, apparent that an additional amount of amino compound should be employed initially to act as a medium for the reaction. However, this excess of amino compound may sometimes be reduced by the use of an inert diluent retaining sufficient amino compound for replacement of the chlorine atoms with the $—NXX_1$ grouping and still having sufficient to act as a hydrohalide acceptor described below. Finally, since hydrogen chloride will be liberated during the reaction, it has been found advantageous to employ an additional amount of amino compound in order to act as a hydrogen chloride acceptor. Because of the foregoing factors, it is apparent that it is difficult to recite any actual molar concentrations of the amino compound which should be used during the reaction due to the variety of conditions and compositions employed. If desired, inert hydrohalide acceptors such as tributyl amine, pyridine quinoline, etc., may be substituted in place of some of the excess amino compound intended as a hydrohalide acceptor.

The following examples give adequate basis for determining molar concentrations. To aid in further understanding the concentrations which are advantageously employed, considering specifically the reaction of ammonia and, for instance, chloromethylheptamethylcyclotetrasiloxane, it will be apparent that two mols of ammonia are necessary for reaction with the carbon-bonded chlorine and also to act as a hydrogen chloride acceptor for the liberated hydrogen chloride. Since there are no other groups of the chloromethylheptamethylcyclotetrasiloxane which are reactive with the ammonia, additional amounts of ammonia need not be provided. However, if there were other reactive groups on the cyclotetrasiloxane as, for example, another carbon-bonded chlorine, or there was present a silicon-bonded chlorine, additional provision for these reactive groups might be required by employing additional molar quantities of ammonia. Since the reaction between the ammonia and the above-described cyclotetrasiloxane is to be conducted in the ammonia as the solvent medium it has been found advisable to use from about 1 to 100 or more additional mols of ammonia over and above that required for effecting the results above.

Due consideration, of course, must be given to the type of amino compound employed, that is, whether ammonia, per se, is used or a primary amino compound or a secondary amino compound is used. In addition, the facility with which the reaction is carried out and the various economics involved in such a reaction using ammonia or the amino compound, which includes the ease with which separation of the components may be effected after reaction is conducted, are further considerations which will determine how large an excess of the amino compound should be employed during the reaction. It is to be understood that the molar concentrations outlined above are solely for guiding persons skilled in the art, and the applicant is not to be considered as being restricted to any of the proportions recited above. Obviously, larger or smaller (where inert solvents are employed) amounts of the amino compound may be used without departing from the scope of the invention. It is believed, however, that persons skilled in the art will readily understand, given a certain set of reactants, the best molar concentrations of amino compound and chlorinated cyclopolysiloxane compound to be used. It has been found that when using liquid ammonia as the amino compound, in order to obtain increased yields of the primary amine derivative, larger molar proportions of the ammonia should be employed. Decreasing the molar proportions of ammonia tends to give greater yields of the secondary and tertiary amino derivatives.

In order that those skilled in the art may better understand how the present invention may be practiced, the following examples are given by way of illustration and not by way of limitation.

*Example 1*

Diethylaminomethylheptamethylcyclotetrasiloxane having the formula $[(CH_3)_2SiO]_3[(C_2H_5)_2NCH_2Si(CH_3)O]$ was prepared by refluxing 75 grams (0.22 mol) chloromethylheptamethylcyclotetrasiloxane, 32 grams (0.44 mol) diethylamine, and 100 ml. toluene. The solution was refluxed for 11 hours with periodic filtration of the precipitated salts to determine the extent of the reaction. Finally, excess diethylamine, 17 grams (0.23 mol), was added and the refluxing was continued for 7 more hours to insure complete reaction. A total of 23 grams of precipitate was obtained; the theoretical weight for diethylamine hydrochloride is 26.5 grams. The toluene solution of the product was washed thoroughly with water to remove all traces of hydrochloride. Distillation gave 32 ml. of a basic silicon-containing material boiling at 110–118° C. at 5 mm. Redistillation of this latter material through a Vigreux column gave a liquid boiling at 60–62° C. at 1 mm., having a refractive index of $n_D^{20}$ 1.4240, and a neutral equivalent of 374 (theoretical, 369). This material represented essentially pure diethylaminomethyl heptamethyl cyclotetrasiloxane.

Example 2

A solution of 75 grams (0.23 mol) chloromethylheptamethylcyclotetrasiloxane in 100 grams (1.4 mols) n-butylamine was refluxed for 3 hours whereupon a two-phase liquid system was obtained. The silicon-containing lower layer was freed of n-butylamine by distillation and the liquid residue which remained formed a two-layer system. The lower liquid layer was separated and found to contain silicon and was free of halogen. Heating for a short time at 150° C. converted the liquid to a soft, solid polymer comprising dimethylsiloxy and n-butylaminomethylmethylsiloxy structural units. Thermal depolymerization at about 500° C. gave a basic liquid distillate having a neutral equivalent of 482. The theoretical neutral equivalents for compositions having an average of 4, 5 and 6 dimethyl groups per n-butylaminomethylmethylsiloxy group are 445, 519 and 593, respectively. Distillation of the cracked product gave a range of basic and non-basic products among which was a small amount of a basic material boiling at around 130–150° C. at 10 mm., having a neutral equivalent of 540 and which was believed to be the cyclic derivative having 5 dimethylsiloxy groups and 1 n-butylaminomethylmethylsiloxy group, whose structure was believed to be

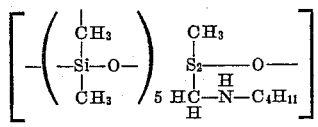

Example 3

Dimethylaminomethylheptamethylcyclotetrasiloxane was prepared by distilling 300 ml. of anhydrous dimethylamine at 8° C. into an autoclave glass liner containing 48 grams (0.15 mole) of chloromethyl heptamethyl cyclotetrasiloxane. The reaction vessel was sealed into an autoclave and rocked at room temperature for 60 hours. The excess dimethylamine was vented, and the crude reaction product was found to consist of a white granular solid suspended in a colorless liquid. The white solid was ether-washed and dried and found to weigh 11.7 grams and containing 40.6% ionic chlorine. This solid accounted for 90% of the chlorine in the starting material since the theory for dimethylamine hydrochloride was 12.4 grams containing 43.5% ionic chlorine. The liquid product gave a negative Beilstein test for halogen and exhibited no visible evidence of decomposition upon distillation of a small portion at atmospheric pressure. Rapid vacuum fractional distillation of 36 grams of the liquid product gave 1.7 grams of product boiling at 91.5° C. at a pressure of 9 mm. Hg, 10.1 grams of a liquid boiling at 92° C. under 9 mm. Hg, and 6.2 grams of a liquid boiling at 92° C. under pressure of 3 mm. Hg. The fractions boiling at 92° C. and 94° C. totalling 16.3 grams (0.48 mole) represented 32% yield of dimethylaminomethylheptamethylcyclotetrasiloxane. The fractions boiling at 91.5° C., 92° C. and 94° C. had the following refractive indices, $n_D^{20}$, respectively, 1.4132, 1.4132 and 1.4131. Analysis of the fraction boiling at 92° C. gave 35.3, 35.2 C; 8.5, 8.6 H; 4.2, 4.2 N, 353 neutral equivalent. Theoretical values are 35.37 C; 8.61 H, 4.13 N; and 340 neutral equivalent. After standing for 2–3 months the fraction boiling at 92° C. had increased in viscosity and had refractive index of $n_D^{20}$ 1.4209.

Example 4

Anilinomethylheptamethylcyclotetrasiloxane was prepared by placing 331 grams (1.0 mole) of chloromethylheptamethylcyclotetrasiloxane, 214 grams (2.3 moles) of anhydrous aniline and 500 ml. of toluene in a flask fitted with a reflux container and protected with a drying tube. The reaction mixture was refluxed for 70 hours and then cooled in an ice bath. 117 grams of aniline hydrochloride were recovered by filtration, washing with toluene, and drying in vacuum, indicating that the reaction was 90% complete. Further refluxing for 95 hours more with an additional 19 grams (0.2 mole) of aniline resulted in the formation of 6 grams of white solid thus bringing the total yield of aniline hydrochloride to 96%. Vacuum distillation of the toluene solution of crude product gave 244 grams of product boiling at 129–49° (at 0.5 mm. Hg with a refractive index of $n_D^{20}$ 1.4703–10, and in addition a little white solid, presumably aniline hydrochloride, and a 62 g. viscous residue. Redistillation of the product gave the following data:

| Cut | B.P., °C/0.5 mm. | Wgt., g. | $n_D^{20}$ |
| --- | --- | --- | --- |
| 1 | 115.7 | 8.1 | |
| 2 | 122 | 11.4 | 1.4698 |
| 3 | 125 | 22.7 | 1.4701 |
| 4 | 127 | 19.7 | 1.4701 |
| 5 | 129 | 31.2 | 1.4703 |
| 6 | 129.5 | 99.9 | 1.4706 |
| 7 | 130 | 36.6 | 1.4706 |
| 8 | Residue | 5.7 | 1.4610 |

The theoretical analysis for $C_{14}H_{29}O_4NSi_4$ is: 43.38 C; 7.54 H; 3.61 N; 28.96 Si. Found Cut 6: 43.9 C; 7.9 H; 3.7 N; 28.5, 29.1, 29.4 Si. Cuts 2–7 represented 222 grams (0.57 mole) 57% yield of anilinomethylheptamethylcyclotetrasiloxane. The product exhibited no tendency to polymerize on standing. Its viscosity did not noticeably increase after almost two years standing.

Example 5

N.N - Phenylmethylaminomethylheptanemethylcyclotetrasiloxane was prepared in a three-liter round-bottom flask fitted with a reflux condenser protected by a drying tube. Into this flask was placed 331 grams (1.0 mole) of chloromethyl heptamethyl cyclotetrasiloxane, 237 grams (2.2 moles) of N-methylaniline and 500 ml. of toluene. The reaction mixture was refluxed for ninety hours whereupon a lower liquid layer separated and solidified on cooling. The solid weighed 131 grams after being washed with toluene and dried in vacuo; the theoretical weight of methylaniline hydrochloride was 144 grams. Vacuum distillation of the toluene solution of product gave 225 grams of product boiling at 135–44° C. at 1 mm. Redistillation of this material gave the following data:

| Cut | B.P., °C/1 mm. | Wgt., g. | $n_D^{20}$ |
| --- | --- | --- | --- |
| 1 | 122 | 3.8 | |
| 2 | 126 | 30.8 | 1.4741 |
| 3 | 128 | 61.3 | 1.4741 |
| 4 | 132–6 | 119.3 | 1.4743 |
| 5 | Residue | 9.0 | |

The theoretical analysis for $C_{15}H_{31}O_4NSi_4$ is: 44.85 C; 7.78 H; 3.49 N. Found for cut 4: 44.9 C; 7.6 H; 3.7, 3.8 N. Cuts 2–4 represented 211 grams (0.53 mole) 53% yield of N,N-methylphenylaminomethylheptamethylcyclotetrasiloxane. Upon standing several weeks the product increased in viscosity and had a refractive index of $n_D^{20}$ 1.4760.

Example 6

N.N - Diethylaminomethylheptamethylcyclotetrasiloxane was prepared by refluxing 467 grams (1.44 moles) of chloromethylheptamethylcyclotetrasiloxane, 315 grams (4.32 moles) of diethylamine, and 800 ml. of iso-octane for 64 hours. A precipitate which was formed was washed and dried and found to correspond in weight to the the theoretical amount of diethylamine hydrochloride. Rapid vacuum distillation of the filtrate and washings gave 122 grams of a product boiling at 90° C. under 1.5 mm. pressure and having a refractive index of 1.4182. This product was analyzed and found to contain 3.8% nitrogen compared to 3.81% theoretical nitrogen. This product represented essentially pure in N.N-Diethylaminomethylheptamethylcyclotetrasiloxane. This product exhibited an increase in refractive index on standing at room temperature. In four days the value reached about $n_D^{20}$ 1.423 where it remained constant for months.

*Example 7* n-Butylaminomethylheptamethylcyclotetrasiloxane was prepared by refluxing 467 grams (1.44 moles) of chloromethylheptamethylcyclotetrasiloxane, 296 grams (4.04 moles) of anhydrous n-butylamine and 800 ml. of iso-octane for 64 hours. A white precipitate which formed during the refluxing period was washed thoroughly with iso-octane and dried in vacuo. This solid weighed 174 grams as compared with the theoretical for n-butylamine hydrochloride of 158 grams. Vacuum distillation of the filtrate and washings gave 44 grams of product boiling at 94° C. under 0.5 mm. Hg and having a refractive index of 1.4195. Analysis of this product showed 38.7 C; 8.7 H; and 4.0 N as compared with the calculated values of 39.20 C; 9.05 H; and 3.81 N. 192 grams of distillate were collected between 75° C. and 94° C. at 0.5 mm. Hg representing 0.52 moles or a 36% yield of n-Butylaminomethylheptamethylcyclotetrasiloxane.

*Example 8*

200 g. (0.60 mol) of chloromethylheptamethylcyclotetrasiloxane were placed in a glass-lined autoclave and the bomb was sealed, evacuated, and charged with 900 ml. 540 g. (32 mols) of anhydrous liquid ammonia. The reaction mixture was rocked at 70° C. for 10 hours and, after cooling, the ammonia was vented. The reaction products were taken up by benzene and the ammonium chloride removed by centrifugation, leaving a clear benzene solution of the amminated cyclopolysiloxane. The benzene was removed by evaporation in vacuum and the product analyzed as follows: 2.1 N, 31.3 C, 8.1 H, 36.2 Si. Theoretical analysis for bis-(heptamethylcyclotetrasiloxanylmethyl) amine is: 2.31 N, 31.74 C, 7.77 H, 37.02 Si. This analysis shows that most of the nitrogen was present as the secondary amine. Mass spectrographic analysis of the product showed the presence of the three amines aminomethylheptamethylcyclopolysiloxane, bis-(heptamethylcyclotetrasiloxanylmethyl) amine, and tris-(heptamethylcyclotetrasiloxanylmethyl) amine.

As pointed out previously, the reaction is conducted in the absence of any alkaline medium. Although, for example, ammonium chloride may be employed with liquid ammonia to give a Lewis-type of Franklin-Germann type acidic medium in the sense more particularly described above, preformed ammonium chloride may not be necessary since the reaction of the ammonia or amino compound with the carbon-bonded chlorine will, in itself, produce sufficient ammonium chloride or the hydrochloride of the amino compound to cause the medium to be acidic in this sense.

The compositions herein described have various uses. Because of the eminent stability of the nitrogen on the carbon, they may be used as intermediates in the preparation of other compositions, for example, ion exchange resins, which would contain silicon therein and might be extremely useful in highly alkaline environments where the stability of the nitrogen under such conditions can be utilized.

The aryl amino compounds herein described are auto catalytic and on standing for a long period of time form linear aryl aminoalkyl cyclopolysiloxane polymers which are useful in the formation of new nitrogen-containing organosilicon-containing silicone rubbers.

In addition, the cyclopolysiloxane compositions containing nitrogen attached to silicon through aliphatic carbon may also be employed, per se, as a basic for various new silicon-containing rubbers, resins, oils, especially lubricating oils, etc., wherein, for instance, cyclopolysiloxanes normally used in making the above-mentioned materials may be modified by the introduction of nitrogen into the organosilicon composition in the manner described above. The introduction of nitrogen, for instance, by means of amino groups and specifically aminomethyl and phenyl aminomethyl ($-CH_2NHC_6H_5$) groups attached directly to silicon atoms, may be helpful in certain applications where improved electrical properties are desired or where under certain conditions the arc-extinguishing properties of nitrogen compounds can be utilized. Salts of the organosilicon compositions containing nitrogen may also be prepared, e. g., salts containing the $-NXX_1-HCl$ grouping where X and $X_1$ have the meanings given previously, which can be used for various purposes as, e. g., quaternary amine salts which can be used as surface active agents, for instance, emulsifying agents. The compositions herein described may also be used as modifying agents for other organopolysiloxane materials whereby the modifying properties of the nitrogen-containing cyclopolysiloxane compositions may be used to advantage.

What I claim as new and desire to secure by Letters Patent of the United States is:

1. Cyclopolysiloxanes consisting solely of silicon and oxygen atoms, and silicon-bonded monovalent hydrocarbon radicals selected from the class consisting of methyl, ethyl, and phenyl radicals, there being present in the aforesaid cyclopolysiloxane a $-NXX_1$ radical attached directly to silicon through an alkyl radical, where X and $X_1$ are members selected from the class consisting of hydrogen, alkyl and aryl radicals, aminoalkyl radicals, and further members wherein X and $X_1$ taken together with the nitrogen form a cycloaliphatic nitrogen-containing radical.
2. n-Butylaminomethylheptamethylcyclotetrasiloxane.
3. Dimethylaminomethylheptamethylcyclotetrasiloxane.
4. N,N - phenylmethylaminomethylheptamethylcyclotetrasiloxane.
5. Analinomethylheptamethylcyclotetrasiloxane.
6. Aminomethylheptamethylcyclotetrasiloxane.

References Cited in the file of this patent

UNITED STATES PATENTS

| | | |
|---|---|---|
| 2,474,578 | Gilliam | June 28, 1949 |
| 2,522,053 | McGregor | Sept. 12, 1950 |
| 2,567,131 | Speier | Sept. 4, 1951 |

OTHER REFERENCES

Noll: "Jour. Am. Chem. Soc.," vol. 73, received February 19, 1951, pages 5130–4.